EQUIVALENT CONJUGATE
ARM TERMINATING CIRCUIT
[BACK BIASED DIODE]

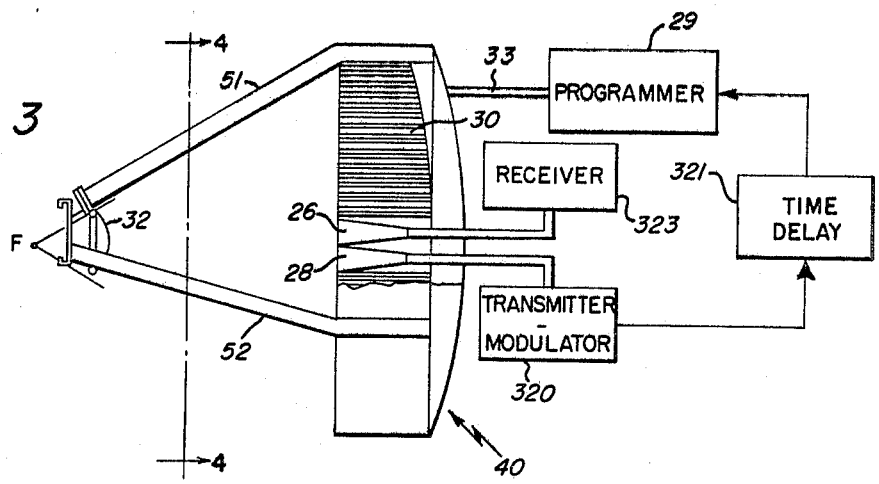
FIG. 3
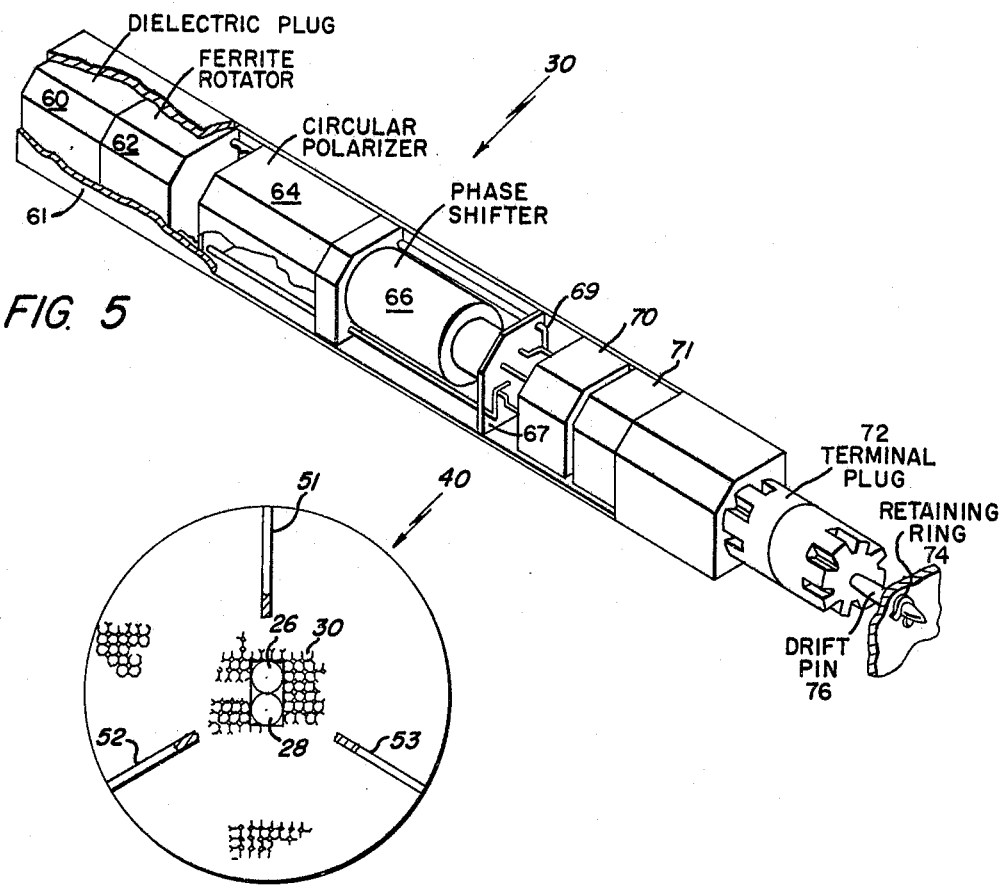
FIG. 5
FIG. 4
INVENTOR
WILLARD W. McLEOD, JR.
BY Leo R. Reynolds
AGENT INVENTOR
WILLARD W. McLEOD, JR.
BY Leo R. Reynolds
AGENT

EQUIVALENT CONJUGATE
ARM TERMINATING CIRCUIT
[FORWARD BIASED DIODE]

INVENTOR
WILLARD W. McLEOD, JR.

BY Leo R. Reynolds

AGENT

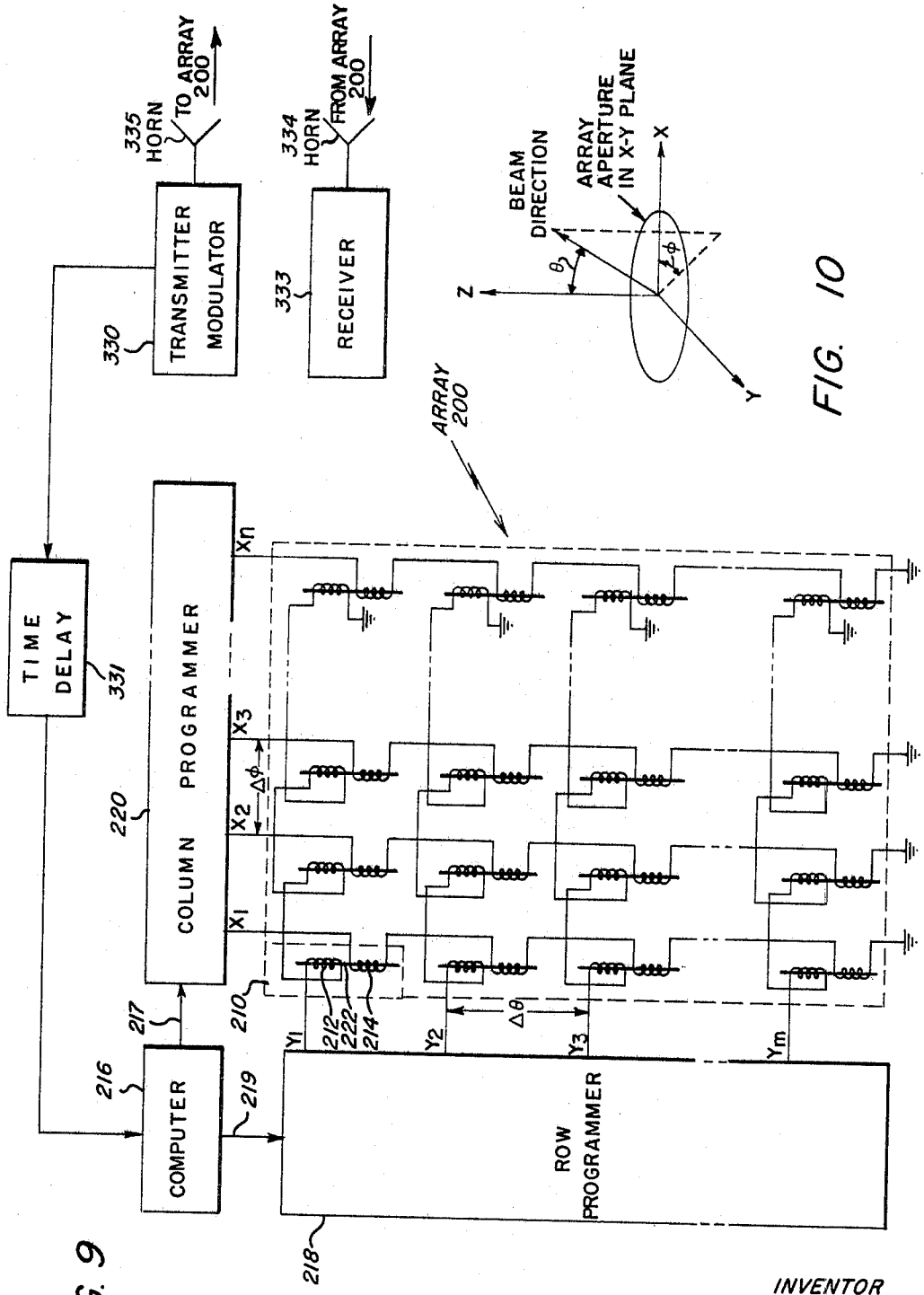

United States Patent Office 3,484,784
Patented Dec. 16, 1969

3,484,784
ANTENNA ARRAY DUPLEXING SYSTEM
Willard W. McLeod, Jr., Lexington, Mass., assignor to Raytheon Company, Lexington, Mass., a corporation of Delaware
Filed Nov. 5, 1963, Ser. No. 322,009
Int. Cl. G01s 9/02
U.S. Cl. 343—5                    12 Claims

ABSTRACT OF THE DISCLOSURE

A beam steering radar having a steerable collimating lens including an array of variable phase shifters under the control of a programmer, and a remote transmitter and receiver located in respective first and second directions from the lens. By alternately changing the phase shifters in relation to the first and second directions, the lens functions as a transmit-receive device in addition to directing the radar beam in accordance with target position.

---

This invention pertains to an antenna array system and more particularly to apparatus for duplexing an optically fed antenna array.

An antenna array consists of a plurality of radiant elements suitably spaced from one another. The radiant elements are normally frequency scanned and/or phase controlled in order to provide an electically steered radiating beam. The frequency scanned system comprises an array of radiating elements in which the relative phase of the radiation from each element is controlled by the frequency of the propagated signal. The frequency scanned system has the disadvantage that beam position is dependent upon the frequency of the propagated signal. Accordingly, where, for example, the antenna array of a frequency scanned system is used as a target tracking device, it would be impossible to assign pre-set frequencies to individual targets in a multiple target tracking situation. The phase controlled system, while eliminating the beam position frequency dependence problem, creates a different problem of structural complexity. In the phase controlled systems of the past, each individual radiant element is controlled in phase by a phase shifter. The phase shifters are, in turn, driven by a central computer to establish the proper radiated phase front for a given desired beam direction. The radiant elements of the antenna are fed by a complex corporate structure type network of directional couplers physically coupled to individual radiant elements. The complexity of the feed network contributes to the high cost and heavy weight of the system.

A co-pending application, Ser. No. 322,008, filed Nov. 5, 1963, now U.S. Patent No. 3,305,867, entitled Antenna Array System by A. R. Miccioli and D. Archer discloses an improved antenna array system which is optically fed and has beam positioning control independent of frequency and a simplified and relatively light-weight and hence relatively low cost antenna feed network.

In the optically fed array an array of antenna elements, preferably passive elements, is optically fed from one or more radiant sources. Power is propagated from the one or more radiant sources to an array of passive elements disposed in spaced-apart relationship from the radiant sources or horns. Each passive element includes a phase shifting device such as a ferrite phase shifter, mechanical plunger or diode switching apparatus for changing the effective electrical length of the element. Uncollimated and unsteered power from said radiant source incident upon an individual element passes through the phase shifting device and is radiated therefrom with a phase relationship determined by the setting of the individual phase shifters so as to provide the desired collimated and steered radiated phase front. Since the device is reciprocal, energy reflected from distant objects and impinging on the array in the form of substantially parallel rays will be focused by the array in a direction corresponding to the setting of the individual phase shifters.

A single array may be used for transmission and reception by providing conventional duplexing switches such as T-R and A-T-R devices between the transmitter and receiver. However, high-power duplexing apparatus tends to introduce noise into the system and decreases the sensitivity of the apparatus for detection purposes. In addition, a conventionally duplexed system utilizes a single radiant element or elements for both transmission and reception. An element designed for transmission is usually deficient in one or more respects when utilized as a receiving element and vice-versa. Accordingly, in the conventional duplexing apparatus of the prior art a compromise between optimum transmission characteristics and optimum reception characteristics was necessitated. In the apparatus of the present invention, a duplexing system is provided in which the radiant element or elements used for transmission are not used for reception. However, a single array is shared by both the radiant element and a receiver element; thereby permitting the usual cost savings attendant to the duplexing function while still permitting the flexibility attendant to non-duplexed systems and eliminating the need for high-power duplexing apparatus.

In the apparatus of the present invention an array of beam forming elements arranged in spaced apart relationship from a radiant element and a receiving element, is programmed after the transmission interval of said radiant element so that energy returning from reflective objects in the path of the beam formed by said beam forming elements will be focused on said receiving element.

Other objects and advantages of this invention will become apparent from the following specification taken in connection with the accompanying drawings wherein:

FIG. 3 is a partially cut-away side view of a two dimensional Cassegrainian type optically fed and duplexed array system of the invention;

FIG. 4 is a view of the embodiment of FIG. 3 taken substantially along the line 4—4 of FIG. 3;

FIG. 5 shows the details of one of the ferrite passive phase shifter elements of the optically fed array system of FIG. 4;

FIG. 9 shows in schematic form a matrix array of phase shifters embodying a dual-coil phase shift duplex system of the invention; and FIG. 10 is a diagram showing the co-ordinate system used in the equations contained in the description.

Figure 1:
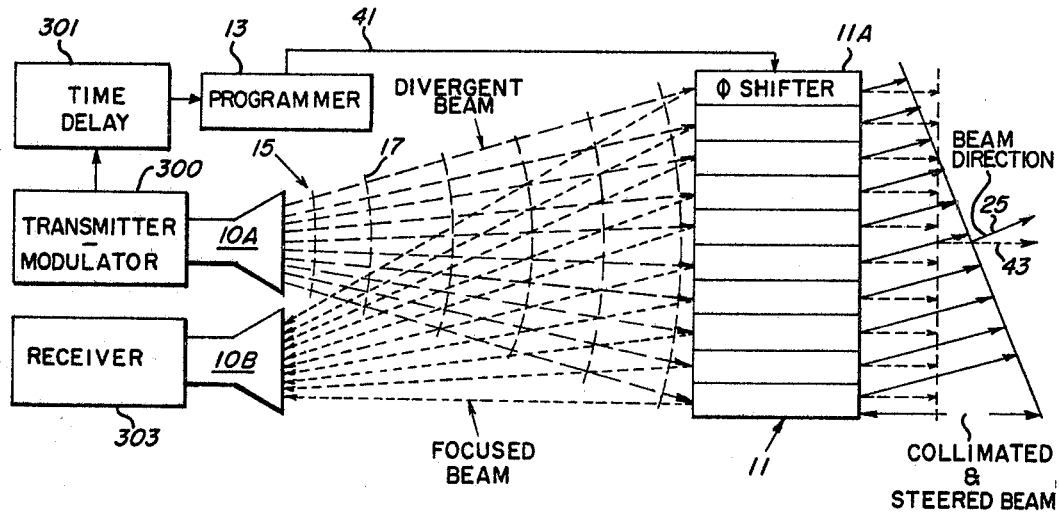
FIG. 1 shows in diagrammatic form a lens type optically fed and duplexed array system of the invention.

Referring specifically to FIG. 1 there is shown a transmitter feed horn 10A disposed in spaced-apart relation from an array 11 comprised of a plurality of passive elements one of which is designated 11A adapted to receive radiation emanating from said horn. Each passive element is comprised of a device whose electrical length may be varied thereby producing a phase shift of the radiation received by said element from said horn. Examples of devices for providing a variable electrical length are ferrite phase shifters, diode phase shifters and mechanical plungers. The former two devices will be subsequently described in detail in connection with FIGS. 6 and 7.

The energy propagated from the horn 10A emerges as an uncollimated or divergent beam indicated by the plurality of divergent rays 15 having a spherical wavefront 17. Collimation and steering of the optically fed beam from horn 10A takes place within the plurality of phase shifting elements of the array 11 and results from the programmed introduction from programmer 13 of a predetermined amount of phase shift to the energy received by each of the passive elements. For example, where a well known ferrite phase shifter is utilized for the passive elements one of the array 11, energy incident upon an individual element is radiated from the opposite end with a phase determined by the current through the ferrite solenoid coil. Initially, each ferrite phase shifter is excited with sufficient current to produce a phase shift which will collimate the divergent beam emanating from horn 10A. The collimated unsteered beam is indicated in FIG. 1 by the numeral 43. Beam steering is accomplished by programming the requisite control currents needed to establish a phase shift across the array which will tilt the beam the desired angle in the direction, for example, indicated by numeral 25. Each of the currents are generated in programmer 13 which may comprise for example a digital computer which determines the proper phase shift for each element for any desired beam position and supplies current of the appropriate value to each of the solenoid coils so as to change the phase of the incident energy the desired amount. The requisite currents are coupled by way of cable 41 to the control coil of the individual ferrite phase shifters of the array.

The transmitter horn 10A of FIG. 1 is connected to a suitable energy source such as a radar transmitter-modulator 300 or the like. It should be understood that any number of horns may be used to optically feed the array 11 of FIG. 1. It is also to be understood that because of the inherent reciprocity of the system of FIG. 1, the system embodied therein may function in the reverse manner, that is, as a receiver. In accordance with the invention when so operated, the phase shifting elements are programmed so as to sequentially focus or converge energy emanating from different directions in space upon receiver horn 10B which receives or accumulates the energy so focused. For example, the trigger or modulator signal from the transmitter-modulator 300 is coupled to time delay device 301 and time delayed a predetermined amount sufficient to allow time for the energy transmitted from horn 10A to be steered and collimated during passage through array 11A. The array is then reprogrammed by programmer 13 so as to focus energy reflected from objects in the path of the propagated beam towards the receiver horn 10B. Receiver horn 10B couples the received energy to receiver 303. Reprogramming is accomplished in response to the time delay signal coupled from time-delay device 301. It is to be understood that instead of using a time delay device, the trailing edge of the transmitted pulse could be used to initiate reprogramming if desired. Depending on the repetition rate of the transmitter, the programmer 13 is adjusted to revert back to the transmit mode of propagation prior to the initiation of another transmit pulse. A well-known multivibrator gating circuit or other such device within the programmer accomplishes this function.

Figure 2:
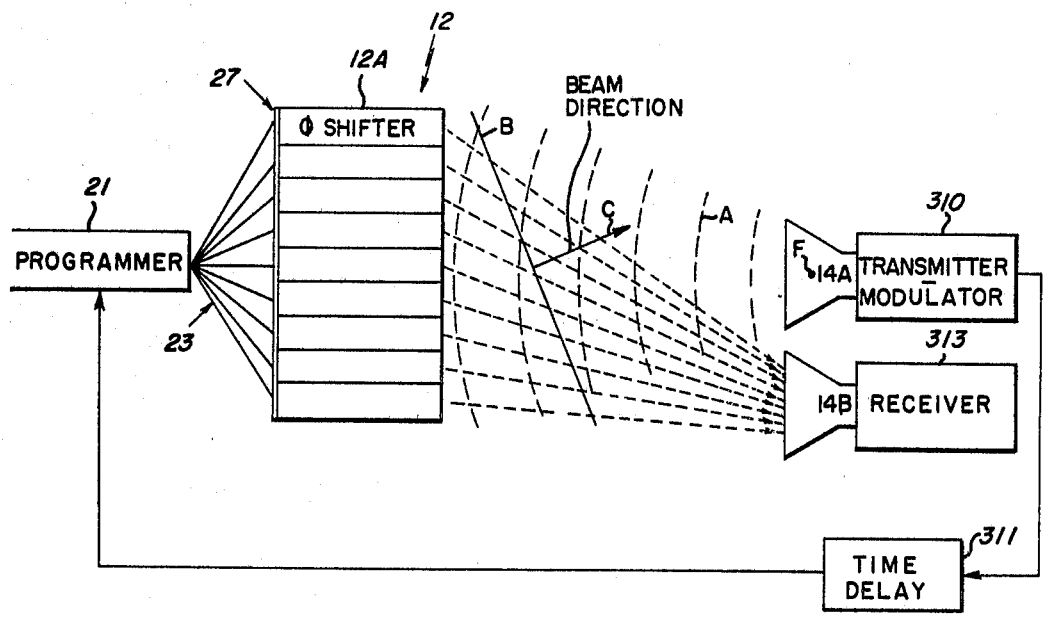
FIG. 2 shows in diagrammatic form a reflector type optically fed and duplexed array system of the invention.

FIG. 2 illustrates a reflector type optically fed array system of the invention which utilizes re-entrant type phase shifters for the passive elements one of which is designated 12A of the array 12. In the embodiment of FIG. 2 a radiant element such as transmitter horn 14A is suitably coupled to a transmitter-modulator 310 and is preferably disposed at the focal point F of an electrically equivalent parabolic reflector initially formed by the variable electrical path lengths of the individual phase shifters of antenna array 12. Although a parabolic shape is chosen herein for ease in explanation, it is to be understood that any appropriate surface may be chosen depending on the location of the horn 14A as long as the array elements are initially set so as to delay or advance the path length of the individual packets of energy or rays incident upon each passive element from radiant element 14A so that the path length of each ray is equal, thereby to form a collimated or plane wave front of the beam as it emerges from the array. In the case of a parabolic reflector herein described, the phase shifters are initially set, as by adjusting the coil current in the case of ferrite phase shifters, so as to provide an effective electrical length across the surface of the array equivalent to that of a parabolic surface. Coil current is provided by way of leads 23 from programmer 21 in the manner described in connection with FIG. 1. Power or energy from transmitter horn 14A is radiated toward the array 12 in a divergent beam designated A in FIG. 2. Each element of the array comprises, for example, a waveguide channel whose electrical length is controlled by, for example, a ferrite phase shifter. The waveguide channels are terminated at end 27 in a short circuit. Accordingly, power incident upon an element enters the waveguide channel, passes through the phase shifter, is reflected from the short circuit, passes through the phase shifter again and is reradiated with a phase determined by the current setting of the ferrite phase shifter. Since the electrical length of each of the passive elements of the array 12 is initially established so as to form an equivalent parabolic surface, the divergent rays emanating from transmitter horn 14A are collimated upon passage through the individual elements of the array and thereby converted into a plane wave front of uniform phase designated by the letter B. An additional amount of phase shift is imposed upon the divergent beam emanating from transmitter horn 14A in the manner described in connection with FIG. 1 by programming appropriate currents from programmer 21 through the coils of the individual ferrite phase shifters of the array 12 so as to steer the beam B in any desired direction. The apparatus of FIG. 2 and in particular the array 12 of FIG. 2, may be utilized as either a transmitting array or a receiving array since energy emanating from, for example, direction C will be received by the array 12, phase shifted and reflected back towards the transmitter horn 14A. To this end, a receiver horn 14B is provided in proximity to horn 14A. Receiver horn 14B is suitably coupled to a receiver 313. Receiver 313 is a well known device for detecting energy and may include for example suitable display and synchronization circuits for displaying the range, azimuth and elevation of the reflecting objects intercepted by the transmitted beam. The trigger pulse or modulating signal from transmitter-modulator 310 is coupled to delay device 311 time delayed therein and coupled to programmer 21. In response to the time-delayed signal, programmer 21 reprograms the individual phase shifters of array 12 so that energy reflected by objects in the path of the propagated beam is focused or directed on horn 14B. Prior to transmission of the next pulse of energy from transmitter horn 14A, the programmer reverts to its previous setting or is sequenced to a new setting which will steer the beam in a new direction.

It is noted that in the apparatus of FIG. 2 as in the apparatus of FIG. 1, diode phase shifters or mechanical plungers may be utilized in place of the aforementioned ferrite phase shifters to achieve a variable electric length. The apparatus shown in FIG. 2 provides an advantage over that of FIG. 1 in that less ferrite material is required in the apparatus of FIG. 2 since energy is passed through the ferrite phase shifter twice so that for a given length of ferrite material twice the amount of phase shift is distribution can be separated into the sum of two basic independent distributions, one dependent upon the $x$ position of the element, and the other on the $y$ position as follows:

$$\Phi x(\theta, \phi) = \frac{2\pi}{\lambda} x \sin \theta \cos \phi$$

$$\Phi y(\theta, \phi) = \frac{2\pi}{\lambda} y \sin \theta \cos \phi$$

By summing the two distributions at each matrix as shown in FIG. 9, the number of computations required is reduced since all elements in a given row will require the same $\Phi x$ and all elements in a given column will require the same $\Phi y$. In this manner, the number of separate currents required to move a beam from one direction to another is reduced from $n \times m$ to $n+m$.

Referring again to the apparatus of FIG. 9, computer 216 calculates the phase distribution required to move a beam in the direction $\theta$, $\phi$. This information is coupled by way of leads 217 and 219 to a column programmer 220 and row programmer 218 respectively. The necessary column and row currents corresponding to the $x$ and $y$ phase distribution of each of the $n \times m$ phase shifter is generated in programmers 218 and 220 and coupled to their respective control coils. For example, the $x_1$ current which is proportional to $$\frac{2\pi}{\lambda} X_1 \sin \theta \cos \phi$$

is coupled from programmer 220 to control coil 214 of ferrite phase shifter 210. In like manner the $y_1$ current, proportional to $$\frac{2\pi}{\lambda} y_1 \sin \theta \sin \phi$$

from programmer 218 is coupled to control coil 212 of ferrite phase shifter 210. The two control coils 212 and 214 are wound so as to produce a total phase shift in the ferrite proportional to the sum of the two coil currents. All coils in the $x_1$ column are coupled in series to ground and all coils in the $y_1$ row are coupled in series to ground. Accordingly, it becomes apparent from the aforesaid analysis that by summing the $x$ component and $y$ component of the respective phase shifting elements, the number of current signals required to be programmed to an $n \times m$ array of phase shifting elements in order to move a beam in the direction $\theta$, $\phi$ is reduced from $n \times m$ to $n+m$, since all elements in a given row require the same $y$ component and all elements in a given column, the same $x$ component. The advantage of this reduction can be best appreciated when concrete representative numbers such as 100 and 50 are substituted for the $n$ and $m$ symbols above. In other words with a 5000 element array comprised of 100 by 50 elements, the number of control currents is reduced from 5000 to 150 by the above described apparatus. Plannar array 200 comprises $n$ columns and $m$ rows of passive variable electrical length elements disposed in spaced apart relation from transmitter feed horn 335 and receiver feed horn 334. The passive elements include ferrite means for phase shifting energy incident on the elements, and are adapted to receive and steer radiation emanating from transmitter feedhorn 335 during transmission.

After transmission, computed 216 in response to a signal from transmitter-modulator 330, time delayed in time delay device 331 calculates in accordance with the aforementioned formulae the required phase distribution needed to focus the return energy to horn 334. This information is coupled by way of leads 217 and 219 to the respective programmers 220 and 218 which in turn generate the required coil currents for the $n$-columns and $m$-rows of coils so that by suitably coupling said currents to said coils, the return beam is focused on horn 334. The received energy is coupled from horn 334 to receiver 333 and processed in the well-known manner. Just prior to transmission, computer 216 reverts back to the transmit mode of operation and, for example, calculates the phase distribution required to move the beam in the direction $\theta'$, $\phi'$.

Figure 6:
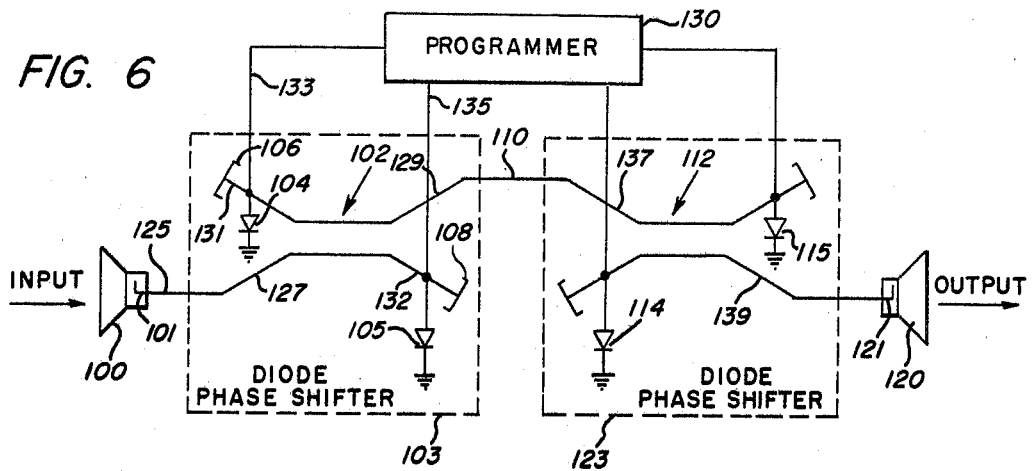
FIG. 6 shows in schematic form an alternate embodiment of a bilateral passive phase shifter element of the invention which utilizes diode switching to effectuate a phase shift.
Figure 7:
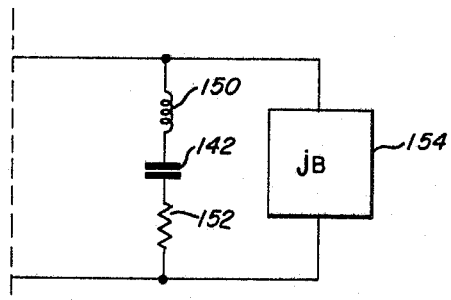
FIG. 7 shows the equivalent circuit for a conjugate arm of the diode phase shifter of FIG. 6 wherein the diode is back-biased.
Figure 8:
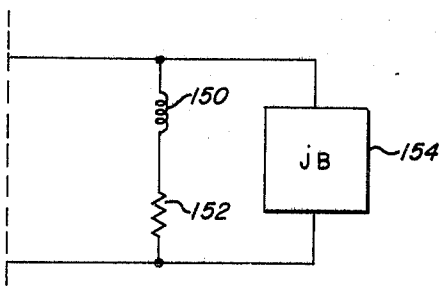
FIG. 8 shows the equivalent circuit for a conjugate arm of the diode phase shifter of FIG. 6 wherein the diode is forward-biased.

In the apparatus of FIG. 6 an alternative embodiment of passive elements utilized in the arrays of FIGS. 1–3 is shown. In this embodiment the passive element comprises one or more diode phase shifters 103 and 123 in cascade connection between an input horn 100 and an output horn 120. Although the apparatus of FIG. 6 is shown in a lens type configuration, a reflector type system is readily obtainable by replacing output horn 120 by a short circuit stub so that power would be reflected back through the circuit of FIG. 6 to the input horn 100 and re-radiated. In the apparatus of FIG. 6 the input signal to horn 100 is collected by probe 101 and coupled by coaxial line 125 to an input orthogonal arm 127 of a hybrid 102 which is preferably of a strip transmission line construction. Diodes 104 and 105 shunt the conjugate arms 131 and 132 of hybrid 102. The conjugate arms are permanently terminated by stub lengths or short circuits 106 and 108. The hybrid conjugate arms will be variably terminated in different admittances depending on the bias applied to the diode from programmer 130. For example, with a forward biasing circuit, the microwave equivalent circuit of conjugate arm 131, is shown in FIG. 8. Thus, under the forward biasing current condition conjugate arm 131 presents the inductance 150 and resistance 152 of the diode 104 in parallel with the susceptance 154 of stub or short circuit 106 to energy coupled through the conjugate arm. With a back-biased diode the equivalent circuit of FIG. 7 obtains and the reverse bias series capacitance 142 is added to the equivalent circuit of FIG. 8 shown in FIG. 7. A change in admittance Y results in a change in phase angle $\phi$ as deduced from the well known relationship $$\phi = -\cos^{-1} \frac{G}{|Y|}$$

wherein G equals the conductance of the circuit (reference P120 Reference Data for Radio Engineers, 4th edition). Accordingly, the input energy to diode phase shifter 103 is phase shifted in discrete amounts upon passage through hybrid 102 by switching the bias of diodes 104 and 105 by means of programmer 130 through leads 133 and 135 therein provided. Additional phase shift is obtained by cascading diode phase shifter 103 with additional phase shifters such as diode phase shifter 123 which is substantially identical to diode phase shifter 103 by coupling output orthogonal arm 129 of phase shifter 103 to input orthogonal arm 137 of hybrid 112 by means of coaxial line 110. Programmer 130 provides biasing current to diodes 114 and 115 of phase shifter 123 in a manner similar to that previously described. It is to be understood that any number of phase shifters can be cascaded in this manner within limits determined by the insertion loss of the phase shifting elements. The input signal from horn 100 is incrementally phase-shifted in diode phase shifter 103, additionally phase-shifted an incremental amount at diode phase shifter 123, coupled out of output orthogonal arm 139 to probe 121 and re-propagated from horn 120. The direction of the resultant beam propagated by an array of the passive elements of FIG. 6 optically spaced from a radiant source so as to intercept energy from said source will be determined by the phase shift introduced into the intercepted energy by the individual diode phase shifters.

This completes the description of the antenna array duplexer of the invention. However, many modifications thereof will be apparent to those skilled in the art.

What is claimed is:
1. In combination:
    an array of electric beam forming elements disposed realized in the apparatus of FIG. 2 as compared to that of FIG. 1. This advantage is achieved, however, at the expense of some aperture blocking resulting from the placement of the transmitter and receiver horns in front of the aperture of the antenna array 12. However, as previously noted it is not necessary that the horns be placed at the focal point of the array. Instead, the horns may be off-set and path lengths equalized by suitable phase shifting within the passive elements. Another drawback to the apparatus of FIG. 2 results, however, from the placement of the transmitter horn 14A in front of the array 12. Frontal placement necessitates a relatively long transmission line between the transmitter 310 and the transmitter horn 14A since the transmitter is normally located behind the array to minimize aperture blocking. Any incerase in transmission line length tends to introduce impedance mismatching in the transmitter horn feed.

The aforementioned drawbacks to the apparatus of FIG. 2 are obviated by the embodiment of FIGS. 3–6 now to be described. In the apparatus of FIG. 3 the individual phase shifters one of which is designated 30 of the antenna array 40 are initially set by programmer 29 in the manner described in connection with FIG. 2 to provide the electrical equivalent of a parabolic reflector surface. The transmitter horn or feed 28 is located near the vertex of the equivalent parabolic reflector. A subreflector 32 having a hyperbolic surface is located in front of the parabolic reflector between the vertex and the virtual focal point F of the parabola formed by the equivalent parabolic surface. Energy propagated from transmitter horn 28 emerges as a divergent beam of rays which rays are reflected from subreflector 32 toward the individual phase shifter elements of the array 40. The hyperbolic subreflector 32 images the transmitter horn 28 so that the horn appears as a virtual image at the focal point F of the parabola formed by the array 40. Accordingly, the reflected energy from the subreflector 32 is focused on the equivalent parabolic reflector formed by the array 40. Energy incident on each element of the array passes through the phase shifter of each element, is reflected from the short circuit at the far end of each element, passes through the phase shifter again and is reradiated with a phase front in a direction determined by the current setting provided by programmer 29 to the individual phase shifters. Programmer 29 provides current to the individual phase shifters over cable 33. Accordingly, the divergent beam emanating from transmitter horn 28 is collimated and steered by the array 40.

After transmission, the programmer in response to a signal from transmitter-modulator 320, time delayed in time delay device 321 reprograms the individual phase shifting elements of array 40 so that received energy is focussed on receiver horn 26 situated adjacent transmitter horn 28. The received energy is suitably coupled from horn 26 to receiver 323 and processed therein in the well-known manner.

The apparatus of FIG. 3, in addition to the aforementioned advantage of minimizing the length of ferrite material required to achieve a given phase shift, reduces the axial length dimension of the antenna system, permits greater flexibility in the design of the feed system, eliminates the need for long transmission lines and accomplishes the duplexing function at low power levels and by means of separate transmitting and receiving elements. It is appropriate to note that the devices thus far described offer a distinct advantage over prior antenna array systems in that amplitude tapering of the beam may be accomplished in the well known manner by merely selecting suitable values of the feed horn dimensions. In the prior art phased arrays, tapering had to be obtained by introducing d.b. couplers of varying attenuation across the array thus necessitating many different coupler designs. It is further noted that beam broadening and forming may be readily accomplished by the introduction of suitable phase shift at the individual elements of the array. FIG. 4 is a view of the apparatus of FIG. 3 taken substatnially along the line 4—4 of FIG. 3 and depicting receiver horn 26, transmitter horn 28, and a plurality of phase shifters one of which is designated 30.

A specific one of the phase shift elements 30 of FIGS. 3 and 4 is shown in detail in FIG. 5. In the apparatus of FIG. 6 energy incident from subreflector 32 is received at the input end of passive element 30. Passive element 30 is comprised of a square waveguide 61 enclosing a re-entrant phase shifter which includes the dielectric plug 60, a ferrite rotator 62, a circular polarizer 64, phase shifter 66 and reflector plate 67 arranged in that order progressing from the front end of the waveguide. The operation of a re-entrant phase shifter is described in detail in U.S. Patent No. 3,100,287 entitled "Electrical Shifters Utilizing Variable Delay Imparted to Circularly Polarized Electric Waves by Variably Magnetized Ferrite Material," issued to Scharfman et al., Aug. 6, 1963.

Briefly, the re-entrant phase shifter operates in the following manner. Phase shifter 66 includes a solenoid coil, not shown, which is energized by leads 69 connected to an external current source by way of terminal plug 72. Terminal plug 72 is shown spaced from phase shifter 66 to provide room for additional components in compartments 70 and 71 not forming a part of the present invention. Retaining ring 74 encircles and supports drift pin 76. The magnetic field created by current flow through the solenoid induces the ferrite loaded circular waveguide of the phase shifter 66 to exhibit a large degree of microwave permeability to a microwave signal circularly polarized in the same direction as the current through the solenoid. The variable permeability produces a phase shift by changing the phase velocity of the signal passing through the ferrite material of phase shifter 66. Accordingly, circular polarized 64 is included in the passive element 30 of FIG. 6 to produce the necessary circular polarization. The incident energy is therefore phase shifted in phase shifter 66, reflected by reflector plate 67, and phase shifted again upon passage back through the ferrite material of phase shifter 66. The linear polarization of the incident wave is restored in circular polarizer 64 and coupled to ferrite rotator 62 wherein it is compensated for the 90° polarization rotation between the incident energy and the reflected wave. The resultant structure forms a highly efficient phase shifter which produces a large phase shift in a small ferrite volume with low insertion loss and minimum power requirements. For systems wherein circular polarization is desired for transmission and reception the element of FIG. 6 can be greatly simplified since in such a system neither the ferrite rotator 62 nor the circular polarizer 64 will be required.

By providing two solenoid control coils around the ferrite material of the phase shifter 66 of the embodiment illustrated in FIGS. 3–5, the requisite programming may be greatly simplified as illustrated in FIG. 9. In the apparatus of FIG. 9 the ferrite phase shift elements of the array are depicted in schematic form. One of the elements, enclosed in dotted lines, is designated by the reference numeral 210. A matrix of array of $n$ columns and $m$ rows of these elements are formed. The array so formed is employed as shown in FIG. 9 in connection with suitable transmitting and receiving apparatus to collimate and steer a beam of energy toward a desired direction. Each ferrite phase shifting element is provided with two control coils, a $\phi$ coil designated by the numeral 212 and a $\theta$ coil designated by the numeral 214 suitably wound about the ferrite element 222.

The phase required for each array element to give a beam in the direct $(\theta, \phi)$ is given by the equation:

$$\Phi x, y(\theta, \phi) = \frac{2\pi}{\lambda}(x \sin \theta \cos \phi + y \sin \theta \sin \phi)$$

where $(x, y)$ is the position of the element in the $xy$ plane of the array as shown in FIG. 10. This required in optically spaced relationship to a pair of electrical elements; and means for directing energy passing through said beam forming elements from one of said electrical elements to a desired direction and for focusing energy passing through said beam forming elements onto the other electrical elements comprising means for varying the electrical length of selected beam forming elements.

2. In combination:

an array of electrical elements disposed in optically spaced relationship to at least one radiant element and at least one receiving element;

means disposed at one end of each said electrical elements for reflecting energy incident thereon back through said electrical elements; and means for directing energy passing through said electrical elements to a desired direction comprising means for varying the electrical length of selected electrical elements.

3. In combination:

radiator means for propagating an uncollimated, substantially omnidirectional energy wave;

controllable lens means disposed in spaced apart relationship from said radiator means in a path of said energy wave for collimating and directing energy incident on said lens means comprising phase shifter means for varying the electrical path length of said lens means; and receiver means adjacent said radiator means for accumulating energy reflected from objects in the path of said collimated and directed energy.

4. In combination:

radiator means for propagating an uncollimated, directionally uncontrollable energy wave;

controllable lens means disposed in spaced apart relationship from said radiator means in the path of said energy wave for collimating and directing said energy comprising phase shifter means for varying the electrical path length of said lens means;

means for reflecting energy intercepted by said lens means back through said phase shifter means; and receiver means adjacent said radiator means for accumulating energy reflected from objects in the path of said collimated and directed energy.

5. Apparatus comprising:

an array of electrical elements each having a variable electrical length, reflector means at one end of each of said elements, the electrical length of each element being of a predetermined value so that the path length of energy impinging on said passive elements from an energy source is equalized;

an energy source disposed within said array;

a receiver element disposed within said array;

a subreflector disposed adjacent said energy source for reflecting energy from said source toward said array;

means for modulating said energy source; and means responsive to said modulator means for varying the electrical length of selected electrical elements during transmission of energy so as to collimate and steer energy from said source and for additionally varying the electrical length of selected elements during reception to focus received energy on said receiver element.

6. The apparatus of claim 5 in which the means for varying the electrical length of said passive elements comprises a ferrite phase shifter.

7. The apparatus of claim 5 in which the means for varying the electrical length of said elements comprises a diode phase shifter.

8. In combination:

a planar array of $n$ columns and $m$ rows of passive variable electrical length elements disposed in spaced apart relation from at least two antenna elements one of said antenna elements being coupled to a receiver and one to a transmitter, each of said passive elements including ferrite means for phase shifting energy incident on said passive elements, said ferrite means having a first magnetic field producing means and a second magnetic field producing means through which current is passed, the amount of phase shift imposed on energy incident upon said passive elements being proportional to the sum of the currents through said magnetic field producing means, each magnetic field producing means in a row being connected in series and each magnetic field producing means in a column being connected in series; and means for controlling the directing of energy incident upon said passive elements from the transmitter coupled antenna during the transmit period and for controlling the focusing of enrgy incident upon said passive elements from reflecting objects during the receive period.

9. The apparatus of claim 8 in which the directing and focusing controlling means comprises means for providing $n$ and $m$ currents, separate ones of said $n$ currents being separately coupled to the $n$ column magnetic field producing means and separate ones of said $m$ currents being separately coupled to the $m$ row magnetic field producing means.

10. In combination:

an array of variable electric length elements;

at least a pair of antenna means disposed in spaced apart relation from said array, one of said antenna means accepting energy at certain intervals of time and the other propagating energy at other intervals of time; and means for directing energy from said propagating antenna means during the propagating interval and focusing energy reflected from objects in the path of said propagated energy during the accepting interval toward the remaining antenna means comprising means for varying the electrical length of selected variable electric length elements.

11. The apparatus of claim 10 in which the variable length elements include a ferrite phase shifter.

12. The apparatus of claim 10 in which the variable length elements include a diode phase shifter.

References Cited

UNITED STATES PATENTS 3,239,799   3/1966   Boucheron.

RODNEY D. BENNETT, JR., Primary Examiner

T. H. TUBBESING, Assistant Examiner

U.S. Cl. X.R.

343—100, 754, 755, 854